March 14, 1933.  B. R. J. HASSELL  1,901,394

ICE CREAM CONFECTION BAR

Filed July 6, 1931

Inventor:
Bert R. J. Hassell

Patented Mar. 14, 1933

1,901,394

UNITED STATES PATENT OFFICE

BERT R. J. HASSELL, OF ROCKFORD, ILLINOIS

ICE CREAM CONFECTION BAR

Application filed July 6, 1931. Serial No. 548,845.

This invention relates to confectionery and more particularly an ice cream bar coated with chocolate or other protective and edible material.

Chocolate-coated ice cream bars are a well known confection. In the making of these bars the bar of ice cream is simply dipped in a bath of chocolate containing a certain percentage of paraffine to facilitate congealing of the coating and give the desired strength to the coating so that the bar will be more apt to hold its shape. The most important criticism of this confection has been that the coating does not adhere properly and solidly encase the core, with the result that it cracks and breaks off in large pieces when bitten into. That is to say, there is no definite mechanical bond between the coating and the core, the two being of different consistencies and characteristics and being brought together under conditions that are unfavorable to the bonding together thereof such that there is no possibility of the one cementing or adhering on the other, and there being furthermore nothing in the core or coating to keep the two together. In other words, the coating had to be self-sustaining. It is, therefore, the principal object of my invention to provide a bar of the kind mentioned, wherein by a simple expedient the coating is caused to unite with the core, thus avoiding the objection mentioned and rendering the confection more practical for general sale.

Another object is to provide a filler material for the ice cream core which, besides giving the desired effect mentioned above, improves the flavor of the bar and makes it more firm so that it will hold up longer and stand more abuse in handling. More specifically stated, I contemplate the use of ground-up popcorn which has characteristics making it ideal for the present purposes; it is light enough so that it will mix evenly in the ice cream without need for agitation, and, while it is absorbent to a certain degree, it does not get soggy but retains its crunchiness, thereby giving a bar which most people prefer to the plain ice cream bar, because it is "chewy".

The invention is illustrated in the accompanying drawing, in which—

Figure 1:
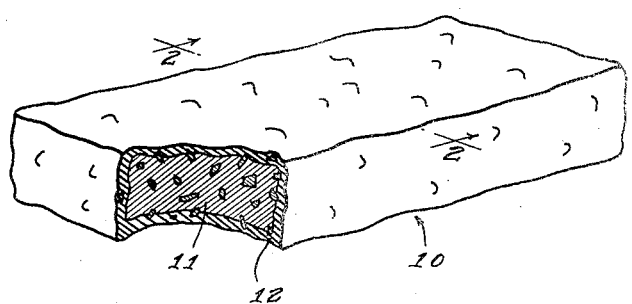
Figure 2:
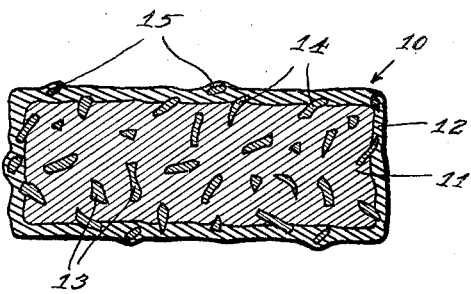

Figure 1 is a perspective view of my improved bar, a portion of which is broken away to show its construction, and Fig. 2 is an enlarged cross-section on the line 2—2 of Figure 1.

While I prefer to use ice cream as the core material in the making of the bar herein illustrated and described, other materials, such as sherbet, having similar properties, might also be found suitable, and the invention is, therefore, not to be regarded as limited necessarily to ice cream.

The bar 10 comprises a core 11 of ice cream coated as indicated at 12 with chocolate or the like. The chocolate or other coating material should contain a certain amount of paraffine to assist in the congealing of the coating, but it will soon appear that in the practice of my invention it may be found entirely practical to cut down the percentage of paraffine inasmuch as the coating is no longer intended to be entirely self-sustaining, as was heretofore the case. In accordance with my invention, the ice cream from which the core 11 is cut in a slab cutter has mixed in it ground-up popcorn and peanuts, of which particles appear at 13 in Fig. 2. For the sake of flavoring, the popcorn before being ground up may be suitably coated with butterscotch. The presence of this ground-up granular material naturally results in numerous small and irregular projections on each piece 11 cut from a slab, as indicated at 14. I have found that these projections are just the thing that is needed to properly knit the chocolate coating 12 to the core 11, the particles forming the projections 14 on the core 11 being embedded partly in the core to begin with and being covered up by the chocolate coating so as to form a good mechanical bond between core and coating. The coating is therefore firmly united to the core and no longer has to be self-sustaining. As a result, it is found that every bar made in this way remains firm and will not crumble when held between the fingers and bitten into. Neither is there any likelihood of portions of the coating cracking and peeling off.

Largely as a matter of improving the external appearance of the bar, I prefer also to mix in with the chocolate the same ground ingredients as are mixed in with the ice cream, as indicated at 15.

The use of popcorn is recommended because it absorbs the ice cream to a small degree but not to the point of losing its identity in the ice cream mix, and it is furthermore not easily cut through in the slab cutter in the cutting of the bars from a slab to serve as the core pieces, thus insuring the projection of large numbers of these particles on each core piece.

Absorption by the popcorn of a certain amount of the milk in the ice cream is considered desirable from the standpoint of making the core firmer. The buoyancy of this material, due to its lightness, insures more even distribution thereof in the ice cream which is important when it is considered that enough popcorn is added to increase the bulk of the ice cream about one hundred percent or more. Furthermore, the popcorn is unaffected by the dipping of the bars in hot chocolate, and the particles project all the more from the ice cream when the latter melts at the surface due to contact with the hot chocolate, thereby insuring a good bond between the core and the coating. Heretofore when plain ice cream cores were used, the surface would melt upon coming in contact with the hot chocolate, and with the subsequent freezing the watery base caused by the melting would freeze more or less into an ice crust next to the chocolate. This watery crust next to the chocolate coating interfered with proper adhesion, and as a result the chocolate coating would crack and break off in large pieces from the core when the bar was bitten into, as every observant person has noticed.

I claim:

1. A confection comprising a core of normally liquid material frozen to a substantially solid state, the core being adapted to be coated by dipping into molten, edible, coating material, said first mentioned material having mixed therein a granular, edible, farinaceous material which is unaffected by the heat of the molten coating material when dipped therein, whereby to provide solid projections on the surface of the core for adhesion thereon of the coating material, and an edible coating for the core.

2. A confection comprising a core of normally liquid material frozen to a substantially solid state, the core being adapted to be coated by dipping into molten chocolate, said first mentioned material having mixed therein ground popcorn which is unaffected by the heat of the chocolate when dipped therein, whereby to provide solid particles on the surface of the core for adhesion thereon of the chocolate, and a chocolate coating for the core.

3. A confection comprising a core of normally liquid material frozen to a substantially solid state, the core being adapted to be coated by dipping into molten, edible, coating material, said first mentioned material having mixed therein particles of a relatively solid edible material which is substantially unaffected by the heat of the molten coating material when dipped therein, whereby to provide solid projections on the surface of the core for adhesion thereon of the coating material, and an edible coating for the core.

In witness of the foregoing I affix my signature.

BERT R. J. HASSELL.